United States Patent
Mortemousque et al.

(10) Patent No.: US 12,550,627 B2
(45) Date of Patent: Feb. 10, 2026

(54) METHOD FOR DETERMINING THE POSITION OF THE COMPLETELY ISOLATED REGIME OF A SPIN QUBIT AND METHOD FOR MANIPULATING AT LEAST ONE SPIN QUBIT

(71) Applicants: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE (CNRS), Paris (FR)

(72) Inventors: Pierre-André Mortemousque, Grenoble (FR); Tristan Meunier, Grenoble (FR); Benoit Bertrand, Saint-Marcellin (FR); Baptiste Jadot, Grenoble (FR); Matias Urdampilleta, Grenoble (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 1084 days.

(21) Appl. No.: 17/560,415

(22) Filed: Dec. 23, 2021

(65) Prior Publication Data
US 2022/0199889 A1    Jun. 23, 2022

(30) Foreign Application Priority Data
Dec. 23, 2020 (FR) ..................................... 2014083

(51) Int. Cl.
*G06N 10/40* (2022.01)
*G06N 10/20* (2022.01)
(Continued)

(52) U.S. Cl.
CPC ........... *H10N 60/128* (2023.02); *G06N 10/20* (2022.01); *G06N 10/40* (2022.01); *H10N 60/11* (2023.02); *H10N 69/00* (2023.02)

(58) Field of Classification Search
CPC ...... H10N 60/128; H10N 60/10; H10N 69/00; G06N 10/20; G06N 10/40
See application file for complete search history.

(56) References Cited

U.S. PATENT DOCUMENTS

| | | | | |
|---|---|---|---|---|
| 7,180,087 B1 * | 2/2007 | Loss | ....................... | H01F 1/408 257/E27.005 |
| 7,836,007 B2 * | 11/2010 | Beausoleil | ............. | G06N 10/20 706/62 |

(Continued)

FOREIGN PATENT DOCUMENTS

| | | |
|---|---|---|
| EP | 3 401 848 A1 | 11/2018 |
| FR | 3 066 297 A1 | 11/2018 |

OTHER PUBLICATIONS

Pierre-Andre Mortemousque et al.; Coherent control of individual electron spins in a two dimensional array of quantum dots Aug. 19, 2018; arxiv.org; pp. 1-14 (Year: 2018).*

(Continued)

*Primary Examiner* — Phenuel S Salomon
(74) *Attorney, Agent, or Firm* — Pillsbury Winthrop Shaw Pittman LLP

(57) ABSTRACT

A method for manipulating a group of quantum dots of a quantum dots matrix, called target group, each target group including a quantum dot and containing a charged particle, the matrix being connected to a reservoir of charged particles, each target group being defined by a potential barrier, each charged particle being a carrier of a charge and spin, the method including, for each target group, a total isolation procedure of the target group relative to the other quantum dots, the potential barrier separating the target group of (Continued)

quantum dots of the matrix adjacent to the target group being configured so that the charged particle(s) contained in the target group cannot cross the potential barrier in order to be moved to the adjacent quantum dots or to the reservoir even when such a transition is authorised from an energy standpoint; and maintaining the target group in the completely isolated regime.

9 Claims, 12 Drawing Sheets

(51) Int. Cl.
*H10N 60/10* (2023.01)
*H10N 69/00* (2023.01)

(56) References Cited

U.S. PATENT DOCUMENTS

| | | | | |
|---|---|---|---|---|
| 8,022,722 | B1* | 9/2011 | Pesetski | G06N 10/40 |
| | | | | 326/6 |
| 9,971,970 | B1* | 5/2018 | Rigetti | H01L 21/76898 |
| 10,074,056 | B2* | 9/2018 | Epstein | H03K 19/195 |
| 10,074,792 | B1* | 9/2018 | Ferguson | H03K 19/1952 |
| 10,354,198 | B1* | 7/2019 | Filipp | H10N 60/805 |
| 10,552,755 | B2* | 2/2020 | Lanting | G06N 10/60 |
| 10,607,993 | B2 | 3/2020 | Hutin et al. | |
| 12,069,967 | B2* | 8/2024 | Cantaloube | H01L 24/24 |
| 2002/0152191 | A1* | 10/2002 | Hollenberg | G16B 15/20 |
| 2015/0066834 | A1* | 3/2015 | Jeffries | H03M 7/70 |
| | | | | 707/752 |
| 2015/0111754 | A1* | 4/2015 | Harris | H03K 3/38 |
| | | | | 365/162 |
| 2016/0292586 | A1* | 10/2016 | Rigetti | G06N 10/00 |
| 2017/0116542 | A1* | 4/2017 | Shim | H10N 60/12 |
| 2020/0127096 | A1 | 4/2020 | Eendebak et al. | |

OTHER PUBLICATIONS

Search Report as issued in French Patent Application No. 2014083, dated Sep. 29, 2020.

Mortemousque, P.-A., et al., "Coherent control of individual electrons spins in a two dimensional array of quantum dots," arxiv.org, Cornell University Library, Aug. 2018, 14 pages.

Bertrand, B., et al., "Quantum Manipulation of Two-Electron Spin States in Isolated Double Quantum Dots," Physical Review Letters, vol. 115, No. 9, Aug. 2015, Retrieved from the Internet: <https://journals.aps.org/prl/pdf/10.1103/PhysRevLett.115.096801>, 5 pages.

Flentje, H., et al., "A linear triple quantum dot system in isolated configuration," arxiv.org, Cornell University Library, May 2017, 5 pages.

* cited by examiner

[Fig. 1]
100
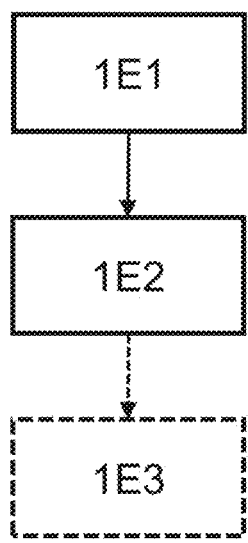
[Fig. 2]
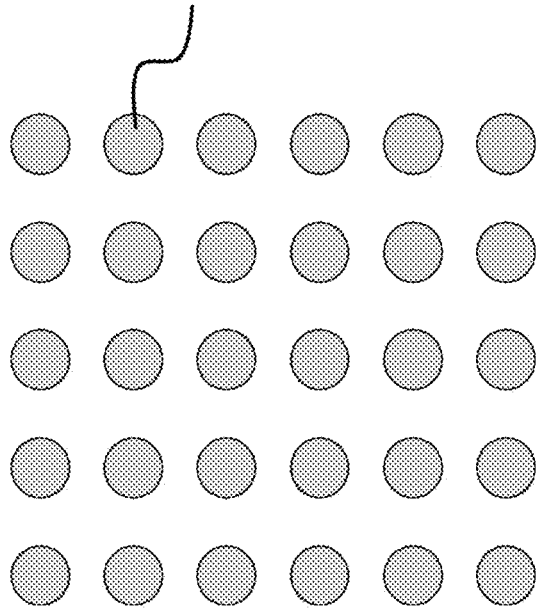

[Fig. 3]
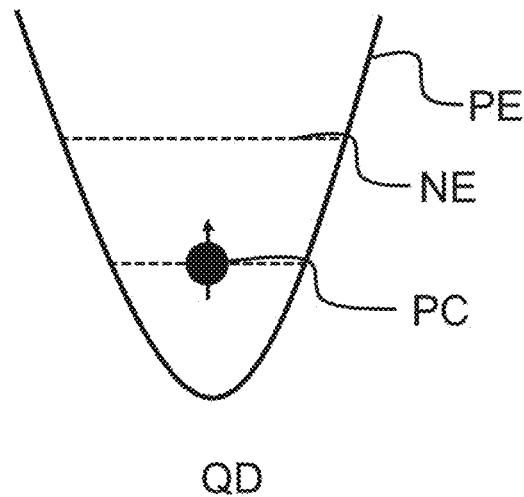
[Fig. 4A]
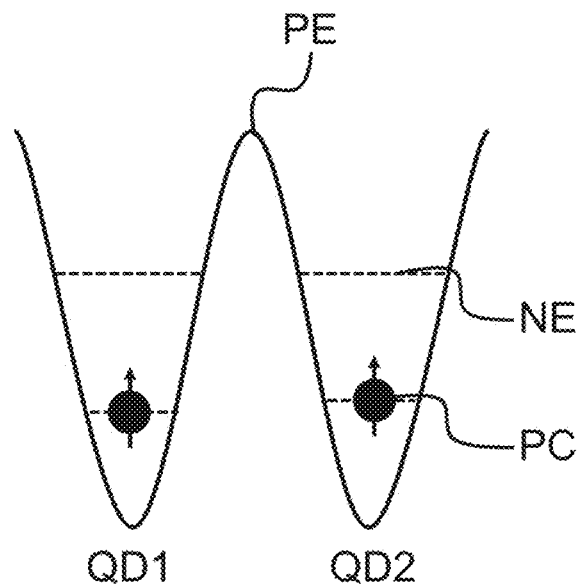

[Fig. 4B]
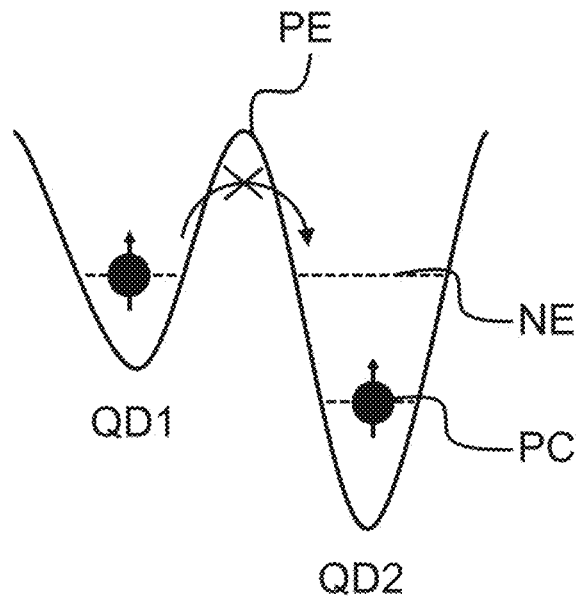
[Fig. 5]
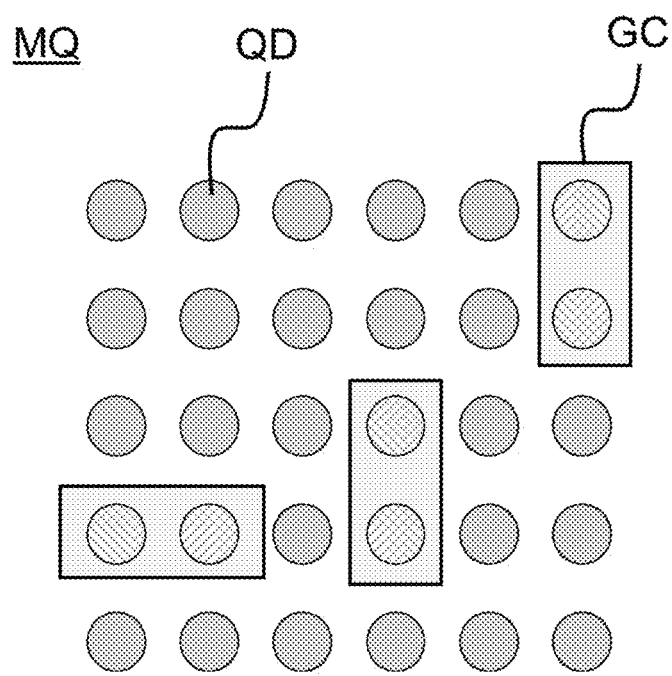

[Fig. 6]
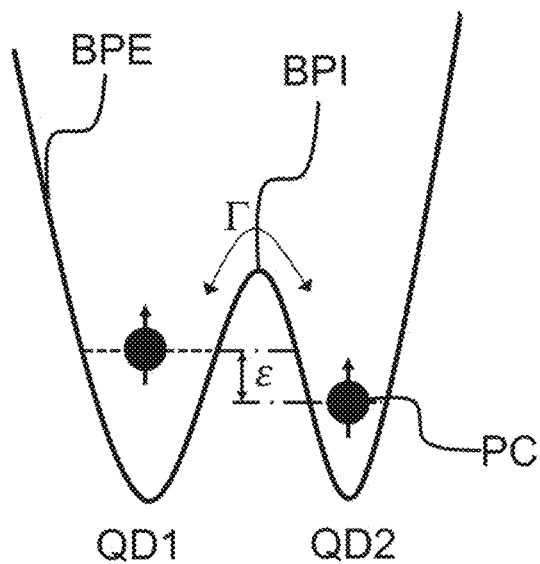
[Fig. 7A]
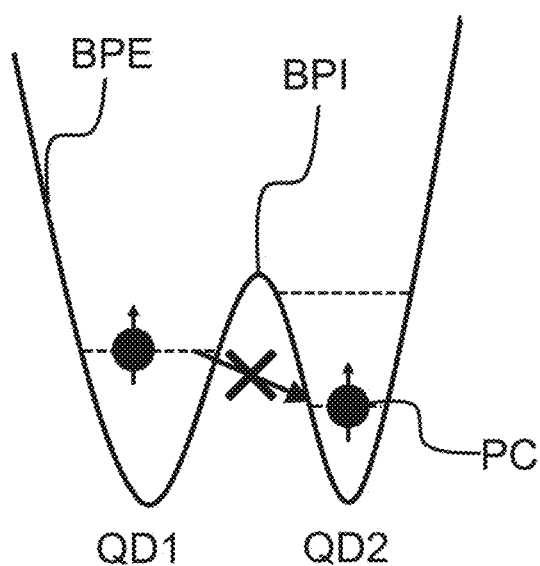

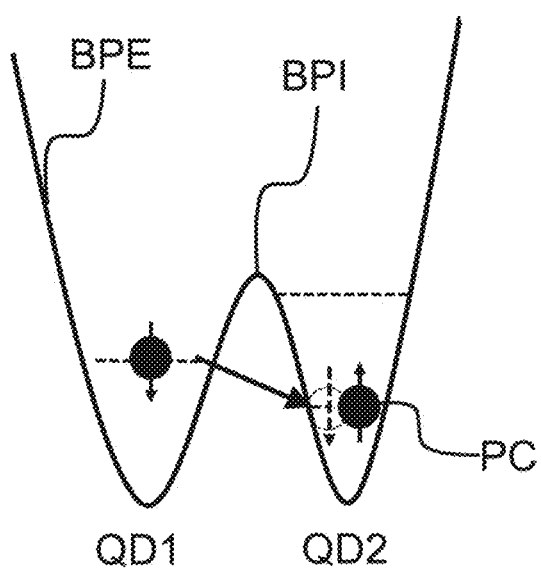

[Fig. 8]
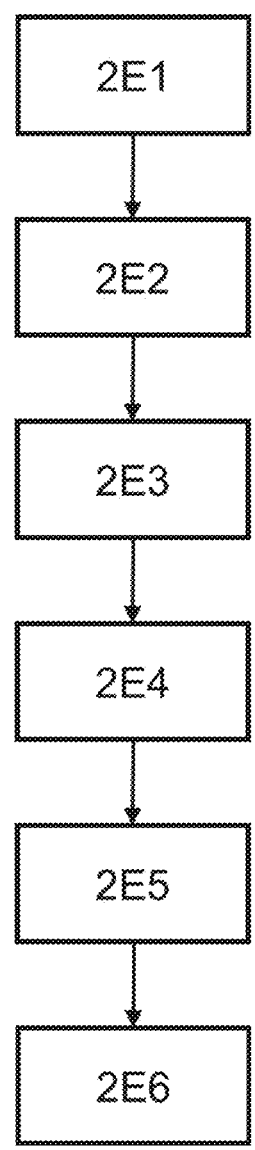

[Fig. 9]
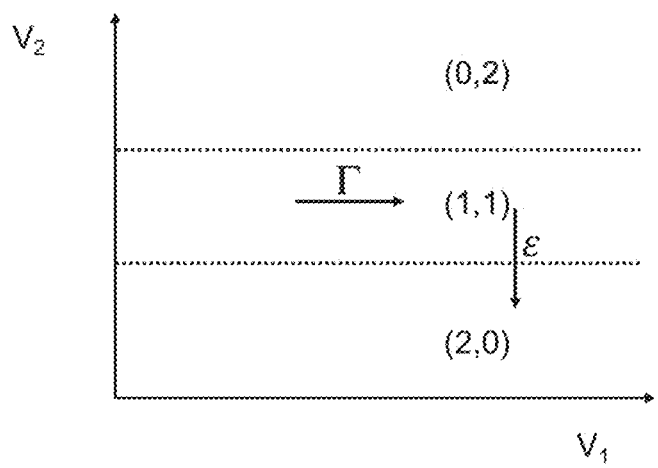
[Fig. 10]
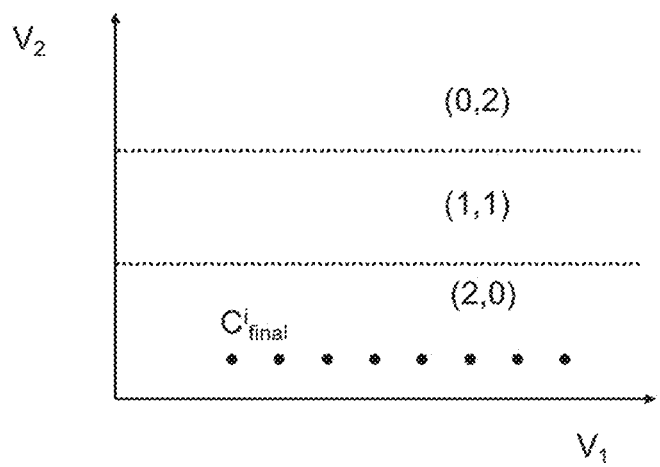
[Fig. 11]
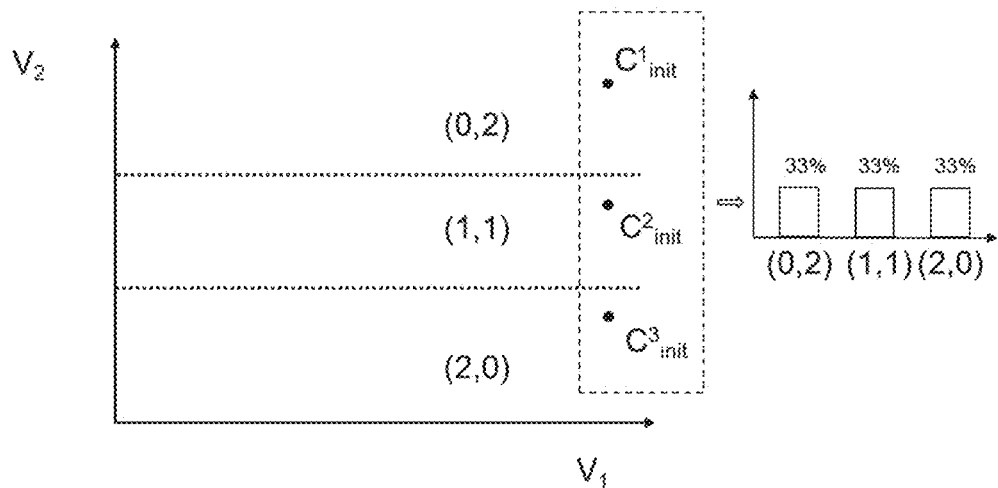

[Fig. 12]
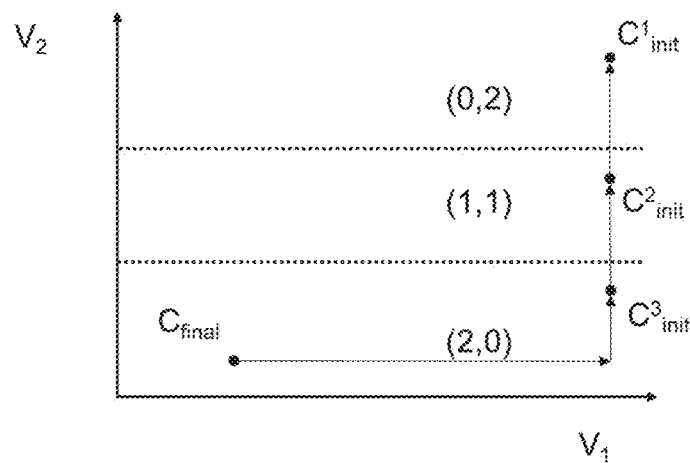
[Fig. 13]
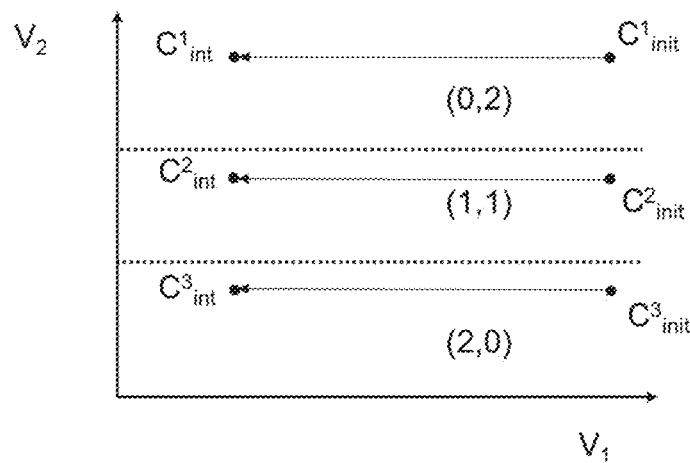

[Fig. 14]
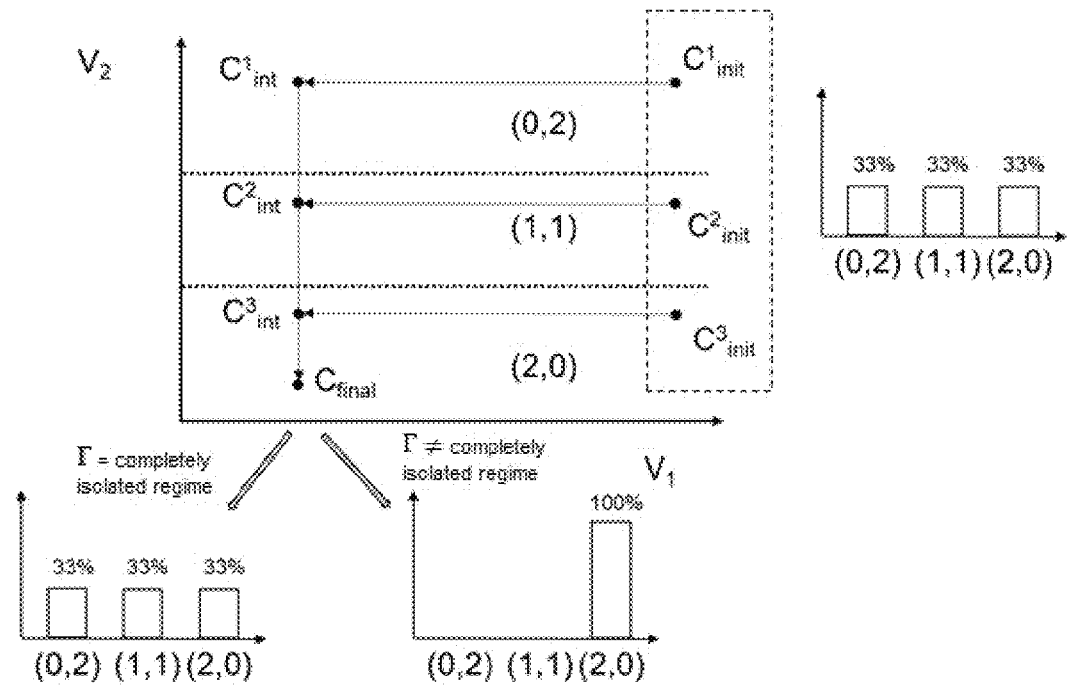
[Fig. 15]
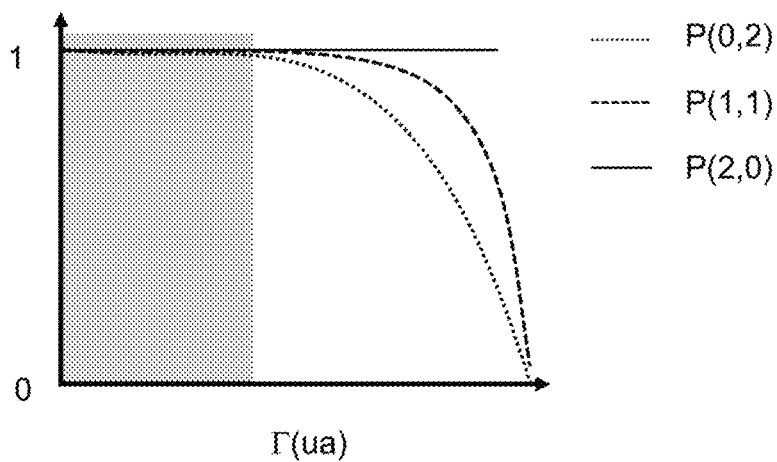

[Fig. 16]
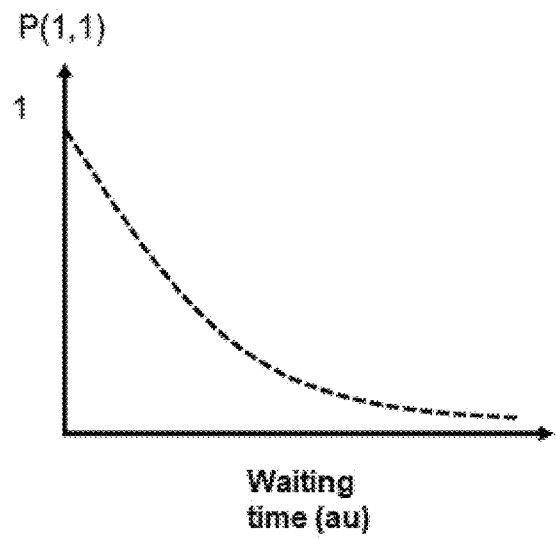
[Fig. 17]
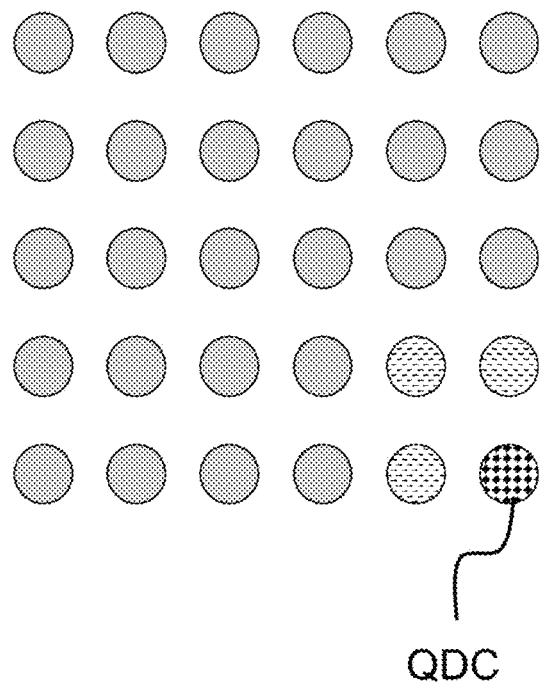

[Fig. 18]
MQ
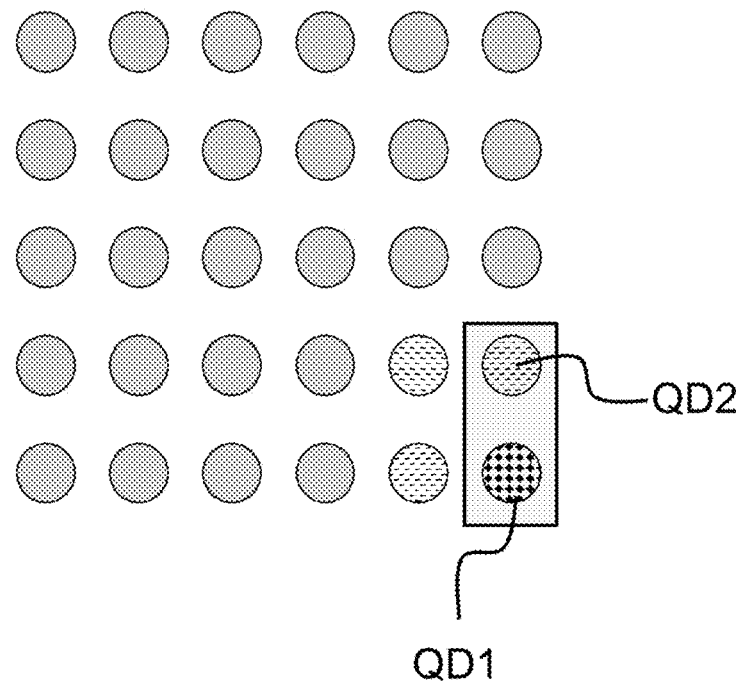
[Fig. 19]
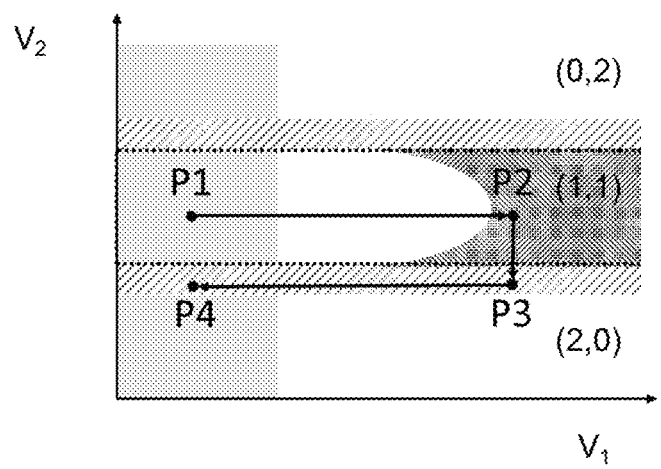

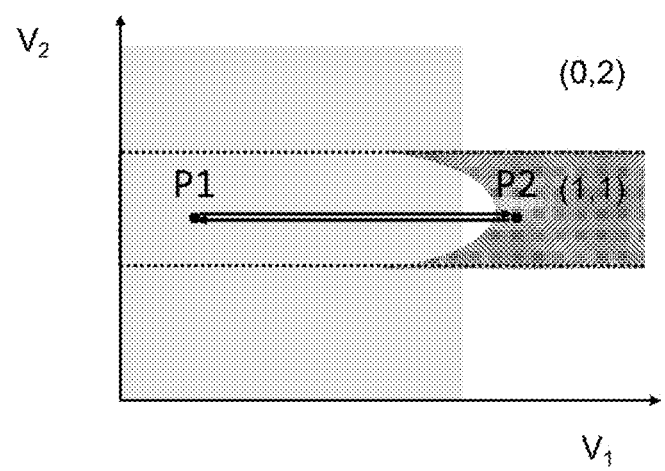
[Fig. 20]

METHOD FOR DETERMINING THE POSITION OF THE COMPLETELY ISOLATED REGIME OF A SPIN QUBIT AND METHOD FOR MANIPULATING AT LEAST ONE SPIN QUBIT

CROSS REFERENCE TO RELATED APPLICATIONS

This application claims priority to French Patent Application No. 2014083, filed Dec. 23, 2020, the entire content of which is incorporated herein by reference in its entirety.

FIELD

The technical field of the invention is that of quantum computing.

The present invention relates to a method for manipulating a spin qubit defined using charged particles trapped in quantum dots and in particular a method wherein one or several qubits are manipulated while they are in a so-called completely isolated regime relative to the other qubits, where the charge state of the spin qubit or qubits is not likely to change.

BACKGROUND

Quantum computing has undergone strong development over the last decade. Among the various technologies proposed, technologies compatible with the CMOS manufacturing techniques seem the most promising, because they are based on controlled manufacturing and characterisation techniques.

A CMOS compatible device is for example described in document EP 3 401 848 A1. The device described in this document makes it possible to obtain a matrix of quantum dots. A system of quantum dots containing charged particles (electron or hole) corresponds to a spin qubit where the quantum information is encoded in their degrees of freedom of spin. It is possible to couple the quantum dots together or with reservoirs. The presence of charged particles is inferred by detection systems sensitive to the presence of charged particles, for example by local electrometers. The electrostatic potentials that make it possible to form the quantum dots and to control their potential are obtained from series of local gates. Using potentials applied on the gates, quantum gates are carried out on the spin qubits.

In order to use this type of device, it is generally necessary to carry out a calibration in order to identify the different operating points useful in implementing quantum gates. Such a method of calibration is for example described in document US2020/0127096 A1 for a device similar to the one described in document EP 3 401 848 A1. In this method of calibration, the number of charge carriers in each quantum dot is fixed by the Coulomb regime. In other words, the charged particle of a first quantum dot cannot go in a second neighbouring quantum dot because for this it would be necessary to "pay" an energy, referred to as charge energy, in order to be able to carry out such a transition. For more details on the Coulomb blockade, the reader can refer for example to chapter 3 of Nazarov, Y., & Blanter, Y. (2009); *Quantum Transport: Introduction to Nanoscience*; Cambridge: Cambridge University Press.

This Coulomb regime, although deemed necessary in order to allow for the manipulation of the qubits, is not without disadvantage. In particular, the charge energy guaranteeing a fixed number of charges in each quantum dot can be comparable to the energies implemented for manipulating qubits, to the extent that the charge state of the quantum dots that is however sought to be fixed can be led to change uncontrollably during this manipulation. These undesirable effects are deleterious for quantum computing.

There is therefore a need for a method that makes it possible to manipulate the target qubits while still limiting as much as possible the modifications of the charge states of the quantum dots during these manipulations.

SUMMARY

The invention offers a solution to the problems mentioned hereinabove, by proposing a method wherein the charged particles are manipulated while they are in a completely isolated regime relative to the other charged particles.

For this, a first aspect of the invention relates to a method for manipulating at least one group of quantum dots of a matrix of quantum dots, called target group, each target group comprising at least one quantum dot and containing at least one charged particle, the matrix of quantum dots being configured for being connected to at least one reservoir of charged particles, each target group being defined by a potential barrier, each charged particle being a carrier of a charge and of a spin, the method comprising, for each target group:

- at least one total isolation step of the target group relative to the other quantum dots of the matrix, the potential barrier separating the target group of quantum dots of the matrix adjacent to the target group being configured in such a way that the charged particle or particles contained in the target group cannot cross the potential barrier in order to be moved to the quantum dots adjacent to the target group or to the reservoir of charged particles even when such a transition is authorised from an energy standpoint, called completely isolated regime;
- a manipulation step during which the target group is maintained in the completely isolated regime.

Thus, during the step of manipulating, the quantum dots of the same target group, although coupled together, are in a completely isolated regime relative to the other quantum dots which makes it possible to ensure the retaining of the charge at each target group during the step of manipulating.

Likewise, when the manipulation step comprises a spin/charge conversion operation, the quantum dot or dots containing the charged particle or particles of which the spin state is to be converted and the quantum dot or dots used for the conversion, although coupled together, are in a completely isolated regime relative to the other quantum dots which makes it possible to ensure the retaining of the charge of the system constituted by these two subgroups of quantum dots during the conversion operation.

In addition to the characteristics that have just been mentioned in the preceding paragraph, the method according to a first aspect of the invention can have one or more additional characteristics among the following, considered individually or according to any technically permissible combinations.

In an embodiment, the manipulation step comprises at least one coherent operation.

In an embodiment, the manipulation step comprises at least one electrostatic control operation.

In an embodiment, the manipulation step comprises at least one spin/charge conversion operation carried out on at least one target group, the target group being divided into a first subgroup of quantum dots and a second subgroup of quantum dots, operation during which the spin state of the charged particle or particles contained in the first subgroup of quantum dots is converted, using a second subgroup of quantum dots into a charge state of the target group, the method further comprising a step of determining the charge state of the target group in such a way as to determine the spin state of the charged particle or particles contained in the first subgroup of quantum dots.

In an embodiment the step of determining the charge state is preceded by a total isolation step of each subgroup of quantum dots of the target group of quantum dots in such a way that the step of determining the charge state is done while the first subgroup and the second subgroup of the target group of quantum dots is in a completely isolated regime.

Thus, during the step of reading the charge state, each subgroup is in a completely isolated regime, which makes it possible to ensure that the charge state of the subgroup involved in the previously mentioned conversion step is identical to the charge state of this subgroup of quantum dots at the end of the spin/charge conversion operation.

In an embodiment, during the isolation step, the manipulation step and/or, where applicable, the step of determining the charge state, the quantum dots that do not belong to a target group are in a completely isolated regime. Thus, during these steps, and in particular the step of manipulating, the non-manipulated quantum dots are in the completely isolated regime which guarantees that their charge state remains fixed and will not be modified by the steps of manipulating target groups.

A second aspect of the invention relates to a method for determining the position of the completely isolated regime between a first quantum dot and a second quantum dot, the configuration of the system constituted by the first quantum dot and the second quantum dot able to be characterised by a first parameter $\Gamma$ relating to the potential barrier separating the two quantum dots of the system and by a second parameter $\varepsilon$ relating to the difference in energy between the ground state of the first quantum dot and the ground state of the second quantum dot, the first and the second parameters able to be modified using at least two voltages applied on gates, the system is characterised by the charge state (1,1), the charge state (0,2) and the charge state (2,0) where the charge state $(n_{QD1},n_{QD2})$ corresponds to a charge state $n_{QD1}$ for the first quantum dot and a charge state $n_{QD2}$ for the second quantum dot, the method comprising, for a plurality of final configurations:

for a plurality of initial configurations corresponding to a known charge state distribution, called initial charge state distribution:
a step of initialising the system in a first configuration corresponding to the initial configuration considered;
a step of decreasing the first parameter $\Gamma$, the system being in a second configuration, called intermediate configuration at the end of this step, the value of the first parameter $\Gamma$ of the intermediate configuration being equal to the value of the first parameter $\Gamma$ of the final configuration considered;
a step of varying the second parameter $\varepsilon$, the value of the first parameter being retained during this step, the system being in a third configuration, corresponding to the final configuration considered at the end of this step;
a step of determining the charge state of the system in the final configuration;
a step of determining the distribution of charge states measured in the final configuration;

a step of comparing the initial distribution of the charge states with the distribution of the charge states measured in the final configuration, the value of the first parameter $\Gamma$ of the final configuration corresponding to a completely isolated regime if the two distributions are substantially identical.

The notation adopted for the charge states must not be interpreted in a limiting manner, but was chosen so as to facilitate the understanding of the invention. Thus, the charge state (1,1) must be understood as the charge state (n,n) where n is a number of charged particles for which the resulting spin is a ½ spin. According to this same notation, the charge state (2,0) (respectively (0,2)) must be understood as the charge state (n+1,n−1) (respectively (n−1,n+1)).

A third aspect of the invention relates to a quantum device comprising a matrix of quantum dots and means configured to implement a method according to a first or a second aspect of the invention.

A fourth aspect of the invention relates to a computer program comprising instructions that, when the program is executed by a computer, lead the latter to implement the method according to a first or a second aspect of the invention.

A fifth aspect of the invention relates to a non-transitory data support or non-transitory computer readable medium that can be read by a computer, on which the computer program is recorded according to a fourth aspect of the invention.

The invention and its different applications shall be better understood when reading the following description and when examining the accompanying figures.

BRIEF DESCRIPTION OF THE FIGURES

The figures are shown for the purposes of information and in no way limit the invention.

FIG. 1 shows a flowchart of a method according to an aspect of the invention.

FIG. 2 shows a diagrammatical representation of a matrix of quantum dots.

FIG. 3 shows a diagrammatical representation of a quantum dot containing a charge particle.

FIG. 4A and FIG. 4B show a diagrammatical representation of two quantum dots in a completely isolated regime relative to one another.

FIG. 5 shows a diagrammatical representation of a matrix of quantum dots on which three target groups of quantum dots are shown.

FIG. 6 shows a diagrammatical representation of a target group comprising two quantum dots.

FIG. 7A and FIG. 7B show the principle of the spin/charge conversion.

FIG. 8 shows a flowchart of a method according to a second aspect of the invention.

FIG. 9 shows a diagrammatical representation of a stability diagram of a system comprising two quantum dots.

FIG. 10 shows a diagrammatical representation of a plurality of final configurations in a stability diagram of a system comprising two quantum dots.

FIG. 11 shows a diagrammatical representation of a plurality of initial configurations in a stability diagram of a system comprising two quantum dots with the density of the corresponding initial charge states.

FIG. 12 to FIG. 14 show a diagrammatical representation of the steps of the method according to a second aspect of the invention.

FIG. 15 shows the probability of retaining the initial state in a method according to a second aspect of the invention according to the value of the first parameter.

FIG. 16 shows the probability of being in the charge state (1,1) according to the waiting time in a method according to a second aspect of the invention.

FIG. 17 shows a diagrammatical representation of a matrix of quantum dots during the implementation of a method according to a second aspect of the invention.

FIG. 18 shows a diagrammatical representation of a matrix of quantum dots during the implementation of a method according to a first aspect of the invention.

FIG. 19 and FIG. 20 show the position of a system in a stability diagram that it is associated with during the implementation of a method according to a first aspect of the invention.

DETAILED DESCRIPTION

Unless mentioned otherwise, the same element appearing on different figures shows a single reference.

In what follows, the charge state of a system (or of a group) comprising a plurality of quantum dots QD will be represented by the following notation $(n_1, n_2 \ldots, n_N)$ with $n_i$ the charge associated with the $i^{th}$ quantum dot QD of the system. For example, the charge state of a system comprising two quantum dots QD each having a charge of 1 will be noted (1,1). Moreover, recall that a spin qubit characterises the degree of freedom of spin of one or more charged particles PC. To define a spin qubit it is therefore necessary to trap one or more charged particles PC in one or more quantum dots QD.

Moreover, "partially isolated" means that the fact the one or more quantum dots QD are isolated from the reservoirs of charge carriers in such a way that no charge can pass from a quantum dot QD to a reservoir or from a reservoir to a quantum dot QD. This therefore means that the total charge at quantum dots QD is invariable, but the charge at each quantum dot QD can change. This is in particular the configuration used in the documents of the prior art.

As has already been underlined, one of the disadvantages of this configuration is the possibility for the charge state of one or more quantum dots QD to change during the step or steps of manipulating. For example, if the system comprises first quantum dots QD each containing a charged particle PC and it is desired to manipulate the charged particles PC contained in a pair of quantum dots QD initially in the charge state (1,1), it is possible for this charge state to be modified by a transfer of a charged particle PC from a quantum dot QD containing a non-manipulated charged particle PC to a quantum dot QD of the pair of quantum dots QD containing the manipulated charged particles PC, the charge state of the pair of quantum dots containing the manipulated charged particles PC then becoming (2,1), instead of remaining in one of the configurations (1,1), (0,2) or (2,0). It is therefore useful to implement a method for manipulating that makes it possible to overcome this risk.

Method for Manipulating According to an Aspect of the Invention

For this, a first aspect of the invention shown in [FIG. 1] relates to a method 100 for manipulating at least one charged particle PC contained in a group GC of quantum dots QD of a matrix MQ of quantum dots QD, called target group GC. In an embodiment, the method 100 of manipulating relates to a plurality of target groups GC each comprising one or more quantum dots QD and each one containing one or more charged particles PC, the manipulation being carried out on the charged particles PC of each one of these target groups GC. In what follows, the expression manipulation of a target group GC must therefore be understood as the manipulation of the charged particles PC contained in the target group GC.

[FIG. 2] diagrammatically shows a matrix MQ of quantum dots QD used in the implementation of a method 100 according to the invention. Each greyed circle shows a quantum dot QD of the matrix MQ that can, through gates (not shown), be controlled in such a way as to be able to be coupled or on the contrary be isolated from the adjacent quantum dots QD. As shall be seen in what follows, the coupling between two quantum dots QD is in particular useful for forming and manipulating the target groups GC mentioned hereinabove. Such a matrix MQ of quantum dots QD is for example shown in FIGS. 1 and 3 of document FR 3066297 A1, which corresponds to U.S. Pat. No. 10,607,993 issued on Mar. 31, 2020, and which is herein incorporated by reference in its entirety.

As shown in [FIG. 3], each quantum dot QD of the matrix MQ of quantum dots QD contains one or several charged particles PC, carriers of a charge and of a spin, and confined by a potential barrier PE. For example, the charged particle PC can be an electron or a hole. In this potential PE, the charged particle PC can adopt several states NE (shown as a dotted line), each state being associated with a spin, the difference in energy between these states NE being according to the electrostatic potential PE and, possibly, the magnetic field. The electrostatic potential PE also makes it possible to modulate the regime wherein the quantum dot QD is with respect to the other quantum dots QD, in particular to configure the quantum dot QD or a target group GC in a completely isolated regime that shall be described in what follows.

Step 1E1 of Total Isolation of the Target Group or Groups

The method 100 for manipulating according to the invention comprises at least one step 1E1 of total isolation of each target group GC, the potential barrier BPE separating the target group GC from the adjacent quantum dots QD being configured in such away that the charged particle or particles PC contained in the target group GC considered cannot cross the potential barrier BPE to be displaced to an adjacent quantum dot QD (and vice-versa) or the reservoir or reservoirs of charged particles PC (and vice-versa) even when such a transition is authorised from an energy standpoint.

Contrary to the partially isolated configuration described in the introduction of this description, the use of the completely isolated regime is specific to the invention. Indeed, although in the prior art the Coulomb blockade regime (or partial isolation regime) is used so as to be able to manipulate the charged particles PC contained in the quantum dots QD (for example in order to implement the desired quantum operations), the present invention demonstrates that it is also possible to manipulate the charged particles PC by operating in a regime beyond the Coulomb regime (in other words, in the completely isolated regime according to the invention) with all the benefits that such a regime procures.

A diagrammatical illustration of the notion of completely isolated regime for two quantum dots is proposed in [FIG. 4A] and [FIG. 4B]. This notion can easily be extended to a target group GC comprising two quantum dots QD or more such as shall be detailed in what follows where the potential barrier ensuring the total isolation of the target group GC is the external potential barrier BPE of the target group GC (cf. [FIG. 6]).

[FIG. 4A] shows a first quantum dot QD1 separated from a second quantum dot QD2 by a potential barrier PE. In the situation of FIG. 4A, the transfer of a charged particle PC from the first quantum dot QD1 to the second quantum dot QD2 (and vice-versa) is not authorised energetically, the levels of energy NE available in each one of the quantum dots QD (i.e. not occupied by a charged particle PC) being above the energy of each charged particle PC.

[FIG. 4B] shows a situation wherein the electrostatic potential within the first quantum dot QD1 was modified, for example during the manipulation of the charged particle PC contained in the quantum dot QD1, and the charged particle PC contained in this first quantum dot QD1 has an energy equal to the energy of the free energy level NE of the second quantum dot QD2. From an energy standpoint, a transfer of the charged particle PC from the first quantum dot QD1 to the second quantum dot QD2 is therefore possible. On the other hand, in the completely isolated regime according to the invention, the height and the width of the potential barrier PE (characterised by the parameter $\Gamma$ known in the field under the name tunnelling rate) are sufficiently high so that such a transfer does not take place over the characteristic time (or characteristic duration) of manipulation of the charged particles PC contained in the quantum dots QD or of the measurement of the charge state of a quantum do QD, noted as $\tau_{manip}$ in what follows. In the example of [FIG. 4B], the charged particle PC therefore remains in the first quantum dot QD1 and the charge state of the latter is therefore unchanged during the time $\tau_{manip}$ that the manipulating or the reading of the charge state lasts.

In other words, considering that two quantum dots QD1, QD2 are in a completely isolated regime with respect to one another (but also with respect to adjacent quantum dots QD) during a manipulating or a reading of the charge state reverts to saying that, during the duration $\tau_{manip}$ of this manipulating or of this reading, the passage via the tunnel effect of a charged particle PC from one quantum dot QD1 to another quantum dot QD2 (or tunnelling) has a very low probability (for example 1/100, even 1/1,000, even 1/10,000, and even 1/100,000) of occurring. So, the preceding condition can be formulated using the following relationship:

$$\Gamma \ll \frac{1}{\tau_{manip}} \quad \text{[Formula 1]}$$

For example, $\Gamma$ is one hundred (100), even one thousand (1000) times, even ten thousand (10000) times less than $$\frac{1}{\tau_{manip}}.$$

Thus, over the characteristic duration $\tau_{manip}$ of the manipulating or of the reading of the charge state, a charged particle PC cannot pass from a quantum dot QD1 in a completely isolated regime to another quantum dot QD2, even if such a transition is energetically authorised.

The characteristic time $\tau_{manip}$ depends generally of the type of manipulation carried out on the charged particles PC contained in the quantum dots QD during the step 1E2 of manipulating which shall be described in what follows.

To give three examples, when the manipulation step 1E2 comprises one or more coherent operations of charged particles PC contained in a target group GC, the characteristic time $\tau_{manip}$ is according to the number of operations associated with the manipulation in question and of the duration of each operation, the duration of each operation itself being according to the Rabi frequency for each type of operation considered.

When this is a reading of the charge (at the end of a spin/charge conversion), then the characteristic time $\tau_{manip}$ is according to the acquisition time of the signal required to distinguish the two possible charge states of the quantum dot QD considered.

When the manipulation is followed by a reading of the charge state, then the characteristic time $\tau_{manip}$ is equal to the sum of the characteristic times of each operation.

This characteristic time $\tau_{manip}$ can furthermore be modified using voltages applied to the gates defining the electrostatic potential PE at each quantum dot QD.

Step 1E2 of Manipulating at Least One Group GC of Quantum Dots QD

The method 100 of manipulating according to the invention also comprises, a manipulation step 1E2. During this step of 1E2 manipulating, the target group or groups are maintained in the completely isolated regime. In other words, the quantum dots QD of the same target group GC are not completely isolated between them, but are in a completely isolated regime relative to the quantum dots QD exterior to the target group GC considered, and in particular quantum dots QD that are adjacent to them.

In an embodiment, a plurality of target groups GC is considered during this step 1E2 of manipulating. In this case, the operations carried out on each target group GC during the step 1E2 of manipulating are generally different. For example, if the step 1E2 of manipulating relates to a first target group GC and a second target group GC, then the operations carried out on the first target group GC can be different from the operation or operations carried out on the second target group GC.

It is interesting to note that, during this step 1E2 of manipulating, several target groups GC can be manipulated in parallel. The completely isolated regime adopted by the different target groups GC makes it possible to guarantee that no charge particle PC is exchanged between the different target groups GC or between the target groups GC and the neighbouring quantum dots QD of the target groups GC.

It will be appreciated that the step 1E2 of manipulating can comprise a plurality of operations which succeed each other over time. The nature of these operations shall be examined in what follows. Before this, the notion of target group GC shall now be detailed.

Illustration of One or More Target Groups GC

In order to illustrate the notion of target groups GC according to the invention, [FIG. 5] and [FIG. 6] shall now be described.

[FIG. 5] shows a matrix MQ of quantum dots QD on which have been materialised by rectangles three target groups GC of two quantum dots QD, the quantum dots QD belonging to a target group GC being represented by circles with square patterns. In this example, only the charged particles PC contained in the quantum dots QD relative to these three target groups GC will be manipulated during the step 1E2 of manipulating.

[FIG. 6] shows a diagrammatical representation of a target group GC comprising a first charged particle PC contained in a first quantum dot QD1 and a second charged particle PC contained in a second quantum dot QD2. In this configuration with two quantum dots QD1,QD2, it is possible to distinguish the potential barrier BPI between the two quantum dots QD1,QD2 which will make it possible to modulate the coupling between the latter of external potential barrier BPE which ensures the completely isolated regime of the target group GC with respect to the rest of the quantum dots QD and in particular quantum dots QD adjacent to the quantum dots QD1,QD2 constituting the target group GC. In other words, it is possible to establish a coupling between two quantum dots QD1,QD2 of the target group GC by modulating the potential barrier BPI that separates them while still retaining a completely isolated regime with the rest of the quantum dots QD.

The configuration of a target group GC comprising two quantum dots QD1,QD2 can be characterised by means of two parameters: the difference between the energy levels NE of each charged particle PC contained in each quantum dot QD1,QD2, noted as ε, and the value of the parameter Γ associated with the potential barrier BPI that separates the two quantum dots QD1,QD2 (and therefore the two charged particles PC contained in the two quantum dots QD1,QD2). It is possible to modify one and the other by application of voltages on the control gates in such a way as to obtain the configuration that is most suited to the manipulation desired. Configuring these two properties for the purpose of a quantum manipulation is a technique well known to those skilled in the art. Such a configuring is for example described in the documents mentioned in the introduction and will therefore not be repeated here for the sake of brevity.

In the example that has just been detailed, the target group GC considered comprises two quantum dots QD1,QD2. However, a target group GC can also comprise only one quantum dot QD (in which case the latter is in complete isolation with regards to all the other quantum dots QD of the matrix MQ during the step 1E2 of manipulating) or three quantum dots QD or more. Generally, the number of quantum dots QD in each target group GC is a function of the type of quantum manipulation that is sought to be applied, and this number can be different for different target groups GC during the same step 1E2 of manipulating.

Coherent Operation

The step 1E2 of manipulating can for example comprise one or more coherent operations of the charged particles PC contained in each target group GC. These operations can for example be implemented using microwaves applied on each target group GC. Two well-known examples of methods via microwaves are the ESR (Electron Spin Resonance) and/or EDSR (Electric Dipole Spin Resonance) methods, and/or exchange pulses. Other techniques can of course be used.

Electrostatic Control Operation

The step 1E2 of manipulating can also comprise one or more electrostatic control operations applied to one or more target groups GC, for example to control the Stark effector the ESR feedback. This type of operation is well known to those skilled in the art and therefore no further details will be given on the latter.

Spin/Charge Conversion Operation

The step of manipulating can also comprise a spin/charge conversion operation carried out on a target group GC constituted of a first subgroup of quantum dots QD1 and of a second subgroup of quantum dots QD2. In this case, the step of manipulating is then followed by a step 1E3 of reading the charge state which will be described in what follows.

During the spin/charge conversation operation, the spin state of the charged particle PC or of the charged particles PC contained in the first subgroup of quantum dots QD1 is converted, using a second subgroup of quantum dots QD2 into a charge state.

The spin/charge conversion operation is a technique well known to those skilled in the art and the latter will therefore not be detailed here, with the general principle of such a conversion being however mentioned. More particularly, this general principle is shown in [FIG. 7A] and in [FIG. 7B] using a target group comprising a first quantum dot QD1 constituting the first subgroup and a second quantum dot QD2 constituting the second subgroup.

In these two figures, the second quantum dot QD2 has an unoccupied energy state, the latter corresponding to a spin down state (down spin also noted as d).

In the configuration of [FIG. 7A], the spin state of the charged particle PC contained in the first quantum dot QD1 is a spin up state (up spin also noted as u), and the charged particle PC of the quantum dot QD1 therefore cannot pass from the first quantum dot QD1 to the second quantum dots QD2. In this configuration, the state of the system remains in the configuration (1,1). In other words, the charge state of the second quantum dot QD2 is not modified.

In the configuration of [FIG. 7B], the spin state of the charged particle PC contained in the first quantum dot QD1 is the spin down state, and the charged particle PC of the quantum dot QD1 can therefore pass from the first quantum dot QD1 to the second quantum dot QD2. In this configuration, the state of the system passes from the configuration (1,1) to the configuration (0,2). In other words, the charge state of the second quantum dot QD2 is modified.

It is understood from this example that the spin state of the charged particle PC contained in the first quantum dot QD1 is converted into a charge state of the second quantum dot QD2. In the present example, a charge state (1,1) corresponds to a spin up state while a charge state (0,2) corresponds to a spin down state, i.e. a modification of the charge state of the second quantum dot QD2 corresponds to a spin down state of the charged particle PC contained in the first quantum dot QD1 and the absence of modification of the charge state of the second quantum dot QD2 corresponds to a spin up state of the charged particle contained in the first quantum dot QD1.

So, in order to determine the spin state of the first quantum dot QD1, it is necessary to measure the charge state of the second quantum dot QD2.

Step of Reading the Charge State

For this, the method 100 according to a first aspect of the invention comprises, for each second group of quantum dots of a target group GC of which the charge state is representative of a spin state (in the preceding example, the charge state of the second quantum dot QD2 is representative of a spin state, here the spin state of the charged particle PC contained in the first quantum dot QD1), a step 1E3 of reading the charge state of the subgroup of quantum dots QD2, the first subgroup and the second subgroup of quantum dots QD being, in an embodiment, in completely isolated regime during this step 1E3, the charge state of the second subgroup of quantum dots considered making it possible to determine the spin state of the charged particle or particles PC contained in the first subgroup of which the state was converted during the preceding spin/charge conversion operation.

As mentioned in the preceding paragraph, in an embodiment, the step 1E3 of determining the charge state is preceded by a total isolate step of the first subgroup and of the second subgroup of quantum dots in such a way that the step 1E3 of determining the charge state is done while the first subgroup and the second subgroup of quantum dots QD of the matrix MQ are in a completely isolated regime. In other words, the charge state of the first subgroup and of the second subgroup of quantum dot QD is frozen and the reading of the charge state of the second subgroup of quantum dots QD involved in the spin/charge conversion operation can be done with quasi-certainty that the charge state of the subgroup is the one that corresponds to the charge state of the subgroup at the end of the conversion operation. In addition, the completely isolated regime has for consequence to increase the distance separating the charged particles PC from the first subgroup and from the second subgroup, which has the benefit of increasing the signal relative to the measurement of the charge state of a given subgroup.

Benefit of the Completely Isolated Regime

The description that has just been given of the steps 1E1, 1E2, 1E3 makes it possible to understand the interest of the completely isolated regime according to the invention better.

In particular, during the step 1E2 of manipulating, the non-manipulated quantum dots QD are desirably in the completely isolated regime which guarantees that their charge state remains frozen and will not be modified by the steps of manipulating target groups GC. Moreover, although coupled together, the quantum dots QD of the same target group GC are in a completely isolated regime relative to the other quantum dots QD which makes it possible to ensure the conservation of the charge at each target group GC during the step 1E2 of manipulating.

In addition, during the step 1E3 of determining the charge state, each subgroup of quantum dot QD of the matrix MQ of quantum dots QD is in a completely isolated regime, which makes it possible to ensure that the charge state of the subgroup QD2 involved in the conversion operation determined during this step 1E3 is identical to the charge state of the subgroup QD2 at the end of the spin/charge conversion operation.

When reading the elements hereinabove and in particular the definition that was given of the completely isolated regime, those skilled in the art can find, with very little effort, the completely isolated regime that corresponds to a given system. However, for the purposes of illustration, a method 200 for determining parameters corresponding to the completely isolated regime in a matrix MQ of quantum dots QD shall now be described.

Method for Determining the Position of the Completely Isolated Regime of a Quantum Dot For this, a second aspect of the invention shown in [FIG. 8] relates to a method 200 for determining the position of the completely isolated regime between a first quantum dot QD1 and a second quantum dot QD2.

As described hereinabove, a system comprising two quantum dots QD1,QD2 can be characterised by a first parameter $\Gamma$ relative to the potential barrier separating the two quantum dots QD1,QD2 of the system and by a second parameter $\varepsilon$ relating to the difference in energy between the ground state of the first quantum dot QD1 and the ground state of the second quantum dot QD2, the first and the second parameter able to be modified using at least two voltages applied on gates. Moreover, the system can either have the charge state (1,1), or the charge state (0,2) or the charge state (2,0) where the charge state $(n_{QD1},n_{QD2})$ corresponds to a charge state $n_{QD1}$ for the first quantum dot QD1 and a charge state $n_{QD2}$ for the second quantum dot QD2.

It is possible to represent the value of these two parameters in a stability diagram such as shown in [FIG. 9]. In this example, the parameter $\Gamma$ can be modulated using a first voltage V1, the modification corresponding to a displacement of the system according to the X axis in the stability diagram. In the same way, the parameter $\varepsilon$ can be modulated using a second tension V2, with the modification of this parameter corresponding to a displacement according to the Y axis in the stability diagram. Thus, in this representation, two points that have the same abscissa correspond to two configurations that have an identical barrier potential r between the two quantum dots QD considered, while two points that have the same ordinate correspond to two configurations that have an identical value of $\varepsilon$. Moreover, the charge state associated with the ground state of each configuration was represented on the stability diagram.

In order to sweep the entire stability diagram and identifier on the latter the values of $\Gamma$ that correspond to an isolated regime, a plurality of final configurations $C^i_{final}$ is chosen, with each final configuration $C^i_{final}$ corresponding to a different value of the first parameter $\Gamma$ of the other final configurations $C^i_{final}$ of the plurality of final configurations $C^i_{final}$ in such a way as to cover all the values of the first parameter $\Gamma$ that the system can have or, at least, that are sought to be characterised. Moreover, the charge state of the ground state is known for each final configuration.

Such a plurality of final configurations $C^i_{final}$ is shown in [FIG. 10] (eight final configurations $C^i_{final}$ in this example). In the example given, all the final configurations $C^i_{final}$ are associated with the same charge state (2,0). However, a final configuration can be associated with any of the three charge states that the system can have.

Furthermore, for each final configuration $C^i_{final}$ of the plurality of final configurations $C^i_{final}$, a plurality of initial configurations $C^i_{final}$ shall be considered. This plurality of initial configurations $C^i_{init}$ corresponds to a known charge state distribution. For example, if the plurality of initial configurations comprises twelve configurations, it will be possible to choose a charge distribution wherein four initial configurations $C^i_{init}$ correspond to a charge state (2,0), four initial configurations $C^i_{init}$ correspond to a charge state (1,1) and four initial configurations $C^i_{init}$ correspond to a charge state (0,2). An example of three initial configurations $C^i_{init}$ is given in [FIG. 11] wherein each initial configuration corresponds to a given charge state that is different from the two other initial configurations. It is possible to associate with these three initial configurations an initial charge state distribution as shown in [FIG. 11] wherein, for example, each charge state is associated with a probability of 33%. For each one of the initial configurations $C^i_{init}$, the method 200 comprises the steps that shall now be described.

The method firstly comprises a step 2E1 of initialising the system in a first configuration corresponding to the initial configuration considered. At the end of this step 2E1 of initialising, the system is in the ground charge state associated with the initial configuration. For example, in [FIG. 11], the charge state of the system during the step of initialising is (0,2) for the first initial configuration $C^1_{init}$, (1,1) for the second initial configuration $C^1_{init}$ and (2,0) for the third initial configuration $C^1_{init}$.

In an embodiment shown in [FIG. 12] for three initial configurations $C^i_{init}$, the step 2E1 of initialising is implemented from the final configuration $C_{final}$ considered and comprises:

a first substep of increasing the first parameter $\Gamma$ up to the value relative to the initial configuration sought, the value of the second parameter $\varepsilon$ not being modified during this first substep;

A second substep of varying the second parameter $\varepsilon$ up to the value relative to the initial configuration sought, the value of the first parameter $\Gamma$ not being modified during this second substep.

As shown in [FIG. 13], the method then comprises a step 2E2 of decreasing the first parameter $\Gamma$ (i.e. an increase in the tunnel barrier that separates the first quantum dot QD1 from the second quantum dot QD2), the system being in a second configuration, referred to as intermediate configuration $C^i_{init}$, at the end of this step 2E2, the value of the first parameter Γ of the intermediate configuration being equal to the value of the first parameter Γ of the final configuration considered.

It is useful to note that only the value of the first parameter Γ is modified and therefore that the value of the second parameter ε of the intermediate configuration $C^i_{init}$ is equal to the value of the second parameter ε of the initial configuration $C^i_{init}$. So, the ground charge state associated with the intermediate configuration $C^i_{init}$ is identical to the ground charge state associated with the initial configuration $C^i_{init}$. In other words, the charge state of the system is not modified during this step 2E2. For example, in [FIG. 13], the charge state of the system at the end of the step of decreasing the first parameter Γ is (0,2) for the first intermediate configuration $C^1_{int}$, (1,1) for the second intermediate configuration $C^2_{int}$ and (2,0) for the third intermediate configuration $C^3_{int}$.

As shown in [FIG. 14], the method also comprises a step 2E3 of varying the second parameter ε, the value of the first parameter Γ being retained during this step, the system being in a third configuration, corresponding to the final configuration $C_{final}$ considered at the end of this step 2E3. It is useful to note that, during this step 2E3, the value of the first parameter Γ is not modified and that therefore the potential barrier separating the two quantum dots QD1,QD2 is not modified. On the other hand, as the value of the parameter ε is modified, the ground charge state associated with the final configuration $C_{final}$ can be different from the ground charge state associated with the initial configuration $C^i_{init}$ (and wherein the system is at the end of the step of initialising 2E1).

It is possible to examine two cases: the first case where the value of the first parameter Γ during this step corresponds to the completely isolated regime and the second case where the value of the first parameter Γ during this step does not correspond to the completely isolated regime. These two cases are diagrammed in [FIG. 14].

In the first case, no charge transfer is possible between the first quantum dot QD1 and the second quantum dot QD2. So, even if the final configuration $C_{final}$ is associated with a ground charge state that is different from the ground charge state associated with the initial configuration $C^i_{init}$, this charge state is not modified during the step of varying the second parameter ε. For example, in [FIG. 14], the charge state of the system at the end of the step of varying the second parameter ε is (0,2) for the system initially (i.e. at the beginning of the step 2E3 of varying the second parameter ε) in the first intermediate configuration $C^1_{int}$, (1,1) for the system initially in the second intermediate configuration $C^2_{int}$ and (2,0) for the system initially in the third intermediate configuration $C^3_{int}$. The result of the above is that, in this first case, the initial distribution of the charge states will be retained. In other words the probability associated with a charge state in the initial state is equal to the probability associated with said charge state in the final state.

In the second case, a charge transfer is possible between the first quantum dot QD1 and the second quantum dot QD2. So, if the final configuration $C_{final}$ is associated with a ground charge state that is different from the ground charge state associated with the initial configuration $C^i_{init}$, the latter is modified during the step of varying the second parameter ε. For example, in [FIG. 14], the charge state of the system at the end of the step of varying the second parameter ε is (2,0) regardless of the intermediate configuration $C^i_{int}$ (and therefore the initial configuration) considered. The result of the above is that, in this second case, the initial distribution of the charge states will not be retained. In other words the probability associated with a charge state in the initial state is different from the probability associated with the charge state in the final state.

In order to be able to establish the charge state of the system in its final configuration $C_{final}$, the method further comprises a step 2E4 of determining the charge state of the system in the final configuration $C_{final}$.

As mentioned hereinabove, these steps 2E1-2E4 are carried out for a plurality of initial configuration $C^i_{init}$. It is therefore possible to constitute a statistic of the charge states measured in the final configuration $C_{final}$ in such a way as to determine a distribution of the charge states measured in the final configuration $C_{final}$ (and therefore the probability associated with each charge state in the final configuration). For this the method comprises a step 2E5 of determining the distribution of charge states measured in the final configuration $C_{final}$.

As already detailed, if the value of the first parameter Γ corresponds to a completely isolated regime, then the distribution of the charge states measured in the final configuration $C_{final}$ will be substantially identical to the initial distribution of the charge states. So, the method comprises a step 2E6 of comparing the initial distribution of the charge states with the distribution of the charge states measured in the final configuration $C_{final}$, with the value of the first parameter Γ of the final configuration $C_{final}$ corresponding to a completely isolated regime if the two distributions are substantially identical. In an embodiment, the initial distribution and the final distribution are identical if, for each charge state, the probability associated with each charge state for the initial configuration is identical to the probability associated with this charge state for the final configuration. In an embodiment, the initial probability is identical to the final probability when the difference in absolute value between the two probabilities is less than or equal to 10% of the initial value, even less than 1% of the initial value, and even less than or equal to 0.1% of the initial value.

Moreover, as these different steps 2E1-2E6 are repeated for a plurality of final configurations $C^i_{final}$ and therefore for a plurality of values of the first parameter Γ, it is possible to identify the position of the completely isolated regime.

From the statistics thus obtained, it is then possible to determine, for a given final configuration and therefore a give charge stated, for example (2,0), the probability that the charge state associated with the initial configuration is retained (i.e. measured 2E4 from the determination of the charge state of the system in the final configuration $C_{final}$) according to the value of the first parameter Γ. Such a probability is shown in [FIG. 15] for the three different initial charge states. From this curve, it is then possible to determine the values of the first parameter Γ corresponding to a completely isolated regime and shown by the greyed zone of [FIG. 15].

In an embodiment, after the step 2E3 of increasing the second parameter ε and before the step 2E4 of determining the charge state of the system in the final configuration $C_{final}$, the method comprises a step of waiting for a predetermined duration. The method 200 according to the invention can then be repeated for different waiting times. This reverts to characterising different characteristic times and therefore to identifying the complete isolation regime according to the characteristic time.

For example, by considering that an initial configuration associated with the charge state (1,1) and a final configuration associated with the charge state (0,2) or (2,0), it is possible to determine the probability that the charge state determined for the final configuration is equal to the charge state (1,1) according to the waiting time. Such a probability is shown in [FIG. 16]. Such a curve makes it possible in particular to determine the value of the first parameter Γ.

At the end of the method 200 according to a second aspect of the invention, it is therefore possible to identify, in the stability diagram of the system, the position of the completely isolated regime of a first quantum dot QD1 relative to a second quantum dot QD2.

Example of Implementation of the Methods According to a First or Second Aspect of the Invention The methods 100, 200 according to a first and second aspect of the invention shall now be shown through an example that makes use of a matrix MQ of quantum dots QD.

Identification of the Completely Isolated Regime for Each Qubit of the Matrix

In a first step, it is suitable to determine the completely isolated regime associated with each quantum dot QD of the matrix MQ. In order to show this identification, the latter shall be implemented for the target quantum dot QDC marked by diamond patterns in [FIG. 17]. This target quantum dot QDC is surrounded by three other quantum dots QD marked by patterns with dashes. The target quantum dot QDC is therefore in a completely isolated regime in relation to the three other quantum dots QD, when it is completely isolated from each one of the three quantum dots QD that surround it. As was detailed hereinabove, the method 200 according to a second aspect of the invention makes it possible to determine the completely isolated regime between a first quantum dot QD1 and a second quantum dot QD2 forming a system of two quantum dots. This therefore entails here implementing this method with each one of the three system that the target quantum dot QDC can form with each one of the quantum dots QD that surround it. Once the method 200 for determining the position of the completely isolated regime has been implemented for the three systems thus identified, the parameters making it possible to configure the target quantum dot QDC in a completely isolated regime in relation to quantum dots QD that surround it are known.

An identical procedure is repeated for each one of the quantum dots QD of the matrix MQ. It is then possible to establish an isolated regime for one or more quantum dots QD or for one or more groups GC of quantum dots QD.

Step of Manipulating Comprising a Spin/Charge Conversion Operation Followed by a Step of Determining the Charge State In this example shown in [FIG. 18], a manipulation step 1E2 comprising a spin/charge conversion operation implemented on a target group GC comprising two quantum dots QD1,QD2 shall be described as the step 1E3 of determining the charge state of the quantum dot involved in the conversion.

The different steps implemented will furthermore be illustrated using a stability diagram shown in [FIG. 19] and relative to the target group comprising a first quantum dot QD1 and a second quantum dot QD2, with the spin/charge conversion operation aiming to convert the spin state of the charged particle PC contained in the first quantum dot QD1 into a charge state of the second quantum dot QD2. Recall that the position of the completely isolated regime of the first quantum dot QD1 with respect to the second quantum dot QD2 in this diagram is known because it was obtained beforehand by the implementing of a method 200 according to a second aspect of the invention. It is shown in the greyed zone on the stability diagram of [FIG. 19]. It is well understood that this greyed zone corresponds to the completely isolated regime by taking account the characteristic time relative to the step of manipulating comprising a spin/charge conversion operation and the step of determining the charge state.

In an embodiment, the method 100 of manipulating firstly comprises a total isolation step of each quantum dot QD of the matrix MQ, the potential barrier PE of each quantum dot QD being configured in such a way that the charged particle PC relative to the quantum dot cannot cross the potential barrier PE to be displaced to an adjacent quantum dot QD even when such a transition is authorised from an energy standpoint. In the stability diagram of [FIG. 19], the system is in the position P1 corresponding to the completely isolated regime. In this region, the spin state of the charged particles contained in the first quantum dot QD1 and the second quantum dot QD2 can be described by the eigenvectors (u,u), (d,d), (d,u) and (d,d) where d means down, u means up, with the first value of the pair being relative to the spin state of the charged particle PC contained in the first quantum dot QD1 and the second value of the pair being relative to the spin state of the charged particle PC contained in the second quantum dot QD2.

The method also comprises a total isolation step 1E1 of the target group GC constituted by the first quantum dot QD1 and the second quantum dot QD2 relative to the other quantum dots QD of the matrix MQ, the potential barrier BPE that separates the target group GC of quantum dots QD adjacent to the target group GC being configured in such a way that the two charged particles PC contained in the target group GC cannot cross the potential barrier BPE in order to be moved to the quantum dots QD adjacent to the target group GC even when such a transition is authorised from an energy standpoint. In the stability diagram of [FIG. 19], the first system is driven to the position P2 that corresponds to a configuration where the electrostatic potential that separates the first quantum dots QD1 from the second quantum dot QD2 is lower allowing for the charge transfer from the first quantum dot QD1 to the second quantum dot QD2 (i.e. outside the total isolation regime of the first quantum dot QD1 with respect to the second quantum dot QD2) required for the spin/charge conversion. The position P2 is in a region (materialised by the zone with square patterns in [FIG. 19]) wherein the spin state of the charged particles PC contained in the first quantum dot QD1 and the second quantum dot QD2 can be described by the eigenvectors S, T−, T+ and T0 (well known to those skilled in the art).

The method then comprises a manipulation step 1E2 comprising a spin/charge conversion operation during which the spin state of the charged particle contained in the first quantum dot QD1 is converted, using the second quantum dot QD2 into a charge state, the first quantum dot QD1 and the second quantum dot QD2 being in a completely isolated regime relative to the other quantum dots QD during this step 1E2. During this step, the system is displaced into the position P3 located in the Pauli blockade region (or spin blockade—known to those skilled in the art and materialised by the striped zone in [FIG. 19]) in such a way as to pass from the charge state (1,1) to the charge state (0,2), with this transition being carried out only for one of the two spin states of the charged particle PC contained in the first quantum dot QD1. In position P3, the spin/charge conversion was implemented and the charge state of the second quantum dot QD2 is according to the spin state of the charged particle PC initially contained in the first quantum dot QD1. As for the position P2, the position P3 is in a region wherein the spin state of the charged particles contained in the first quantum dot QD1 and the second quantum dot QD2 can be described by the eigenvectors S, T−, T+ and T0.

In order to read this charge state the method 100 comprises a step 1E3 of determining the charge state of the second quantum dot QD2, the second quantum dot QD2 being in a completely isolated regime during this step 1E3 (including relative to the first quantum dot QD1), the charge state of the second quantum dot QD2 making it possible to determine the spin state of the charged particle initially contained in the first quantum dot QD1. In the stability diagram of [FIG. 19], the first system is driven to the position P4 which corresponds to a completely isolated regime between the two quantum dots QD1,QD2, by remaining in the Pauli blockade region during the transfer. Once in the position P4, the charge states are frozen and the measurement of the charge state of the second quantum dot QD2 can be done, for example using an electrometer. Note that the reading can be done at any point of the stability diagram that corresponds to a completely isolated regime, the condition being to freeze the charge states after the conversion (i.e. to adopt a completely isolated regime) before modifying the ordinate of the position adopted in the stability diagram for the determining of the charge state. For example, the determining of the charge state could be done in P1 as long as the transition from P3 to P1 is done by passing through P4.

Manipulating a Group of Qubits Comprising Two Qubits

In this example, the manipulation step 1E2 comprises a coherent operation implemented on a target group GC constituted of a first quantum dot QD1 and of a second quantum dot Q2 similar to the system of [FIG. 15] already introduced.

The different steps will furthermore be illustrated using the stability diagram shown in [FIG. 20]. Recall that the position of the completely isolated regime of the first quantum dot QD1 with respect to the second quantum dot QD2 in this diagram is known because it was obtained beforehand by the implementation of a method 200 according to a second aspect of the invention. It is illustrated by the greyed zone on the stability diagram of [FIG. 20]. It is well understood that this greyed zone corresponds to the completely isolated regime by taking account the characteristic time relative to the step of manipulating comprising a coherent operation. Generally, the characteristic time of a coherent operation is much shorter than the characteristic time of a spin/charge conversion operation followed by a step of determining the charge state as in the preceding example. So the greyed zone of the present example is more extended than the greyed zone of the preceding example. This is however only an example and certain coherent operations can be associated with a characteristic time that is longer than the one in the preceding example.

In an embodiment, the method 100 of manipulating firstly comprises a total isolation step 1E1 in transport of each quantum dot QD, the potential barrier PE of each quantum dot QD being configured in such a way that the charged particle PC contained in the quantum dot QD cannot cross the potential barrier PE to be displaced to an adjacent quantum dot even when such a transition is authorised from an energy standpoint. In the stability diagram of [FIG. 20], the system is in the position P1 corresponding to the completely isolated regime at the end of this step 1E1. As already mentioned, in this region, the spin state of the charged particles contained in the first quantum dot QD1 and the second quantum dot QD2 can be described by the eigenvectors (u,u), (d,d), (d,u) and (d,d).

The method also comprises a total isolation step 1E1 of the target group GC relative to the other quantum dots QD of the matrix MQ, the potential barrier BPE separating the target group GC from the quantum dots QD adjacent to the target group GC being configured in such away that the two charged particles PC contained in the target group GC cannot cross the potential barrier BPE in order to be moved to the quantum dots QD adjacent to the target group GC even when such a transition is authorised from an energy standpoint. In the stability diagram of [FIG. 20], during this step, the system is driven to position P2 which corresponds to a configuration where the electrostatic potential separating the two quantum dots QD1,QD2 of the system is lower allowing for the interaction required for the step 1E2 of manipulating. As already mentioned, the position P2 is in a region (materialised by the zone with square patterns in [FIG. 20]) wherein the spin state of the charged particles PC contained in the first quantum dot QD1 and the second quantum dot QD2 can be described by the eigenvectors S, T−, T+ and T0 (well known to those skilled in the art).

The method 100 of manipulating then comprises a manipulation step 1E2 comprising a coherent operation of the target group GC of quantum dots QD1,QD2, step 1E2 during which the spin qubit quantum sots QD of the target group GC are in a completely isolated regime relative to the other quantum dots QD. So, once in position P2, a coherent operation is implemented on the two charged particles PC contained in the quantum dots QD1,QD2 of the target group GC.

Once the step 1E2 of manipulating carried out, the method, in an embodiment, comprises a total isolation step of each quantum dot QD of the matrix MQ. In the stability diagram of [FIG. 20], the second system returns to the position P1 which corresponds to a completely isolated regime of qubits QD.

Device According to an Aspect of the Invention

In order to implemented a method according to the invention, a third aspect of the invention comprises a matrix MQ of qubits QD and a device configured to implement a method according to a first aspect or a second aspect of the invention. It in particular comprises a microwave generator to apply microwaves, for example for implementing ESR (Electron Spin Resonance) and/or EDSR (Electric Dipole Spin Resonance) methods.

Such a device able to be configured to implement the invention is for example described in document FR 3066297 A1, which corresponds to U.S. Pat. No. 10,607,993 issued on Mar. 31, 2020, and which is herein incorporated by reference in its entirety.

For example, the device for manipulating quantum dots or measuring the spin state of the two particles includes at least two quantum dots (and, in an embodiment, a matrix of quantum dots), a reservoir to put charges in the quantum dots, gates to manipulate the quantum dots and the coupling between themselves and a reservoir, and one or measurement devices (for example including an electrometer, which can be implemented with a quantum point contact) in order to determine the charge state of the quantum dots. For example, an electrometer can be used to measure the charge state of one or more quantum dots. U.S. Pat. No. 10,607,993 describes an example of such a device. The voltages applied to the gates are modified through the device to change the operating point of the system (V1 and V2 on the figures—which are simplified illustrations that neglect cross-talk between gates).

An embodiment of the quantum device with spin qubits, comprises at least: a first semiconducting layer comprising a first matrix of data qubits and measurement qubits connected to each other through tunnel barriers; a system of addressing data qubits and measurement qubits configured for controlling conduction of each tunnel barrier by the field effect and comprising at least: first and second electrically conducting portions arranged in first and second superposed metallization levels respectively; first and second electrically conducting vias each comprising a first end connected to one of the first and second electrically conducting portions respectively, and a second end located facing one of the tunnel barriers; a first dielectric layer interposed between the tunnel barriers and the second ends of the first and second electrically conducting vias.

Therefore, in this device, to address data qubits and measurement qubits with electrostatic gates formed by electrically conducting vias positioned facing tunnel barriers connecting the qubits, rather than using electrical connections connected to these qubits directly. These electrically conducting vias are polarised by means of conducting portions of metallisation levels. Each conducting via forms an electrostatic control gate of one of the tunnel barriers connecting the qubits together. These control gates are arranged in a matrix.

An individual qubit can be controlled from row and column addressing of tunnel barriers (for example two, three or four depending on the position of the addressed qubit within the matrix) connected to this qubit and controlled by electrostatic gates formed facing these tunnel barriers.

It is possible that in optimization modes, electrostatic potentials of tunnel barriers of qubits adjacent to the addressed qubit can also be controlled because the control of electrostatic potentials of tunnel barriers connected to the addressed qubit can impact adjacent qubits connected to these tunnel barriers. However, when a qubit is addressed, this qubit is connected to a larger number of tunnel barriers for which the electrostatic potentials are controlled than adjacent qubits due to the row and column addressing made.

With such addressing system, it is possible to make individual addressing of each data or measurement qubit using only two metallization levels, regardless of the size of the qubits matrix and the number of qubits included in this matrix.

The tunnel barriers can be formed from narrower semiconductor portions than those forming the qubits. Such narrower semiconductor portions are called "constrictions".

Each data qubit can be connected to at least two adjacent measurement qubits and each measurement qubit can be connected to at least two adjacent data qubits.

The quantum device may be such that: in the first matrix, the data qubits and the measurement qubits are aligned in first and second directions perpendicular to each other forming rows and columns of the first matrix; the second ends of the first electrically conducting vias are arranged facing some of the tunnel barriers called the first tunnel barriers, each connecting one of the data qubits and one of the adjacent measurement qubits and located on the same row of the first matrix; the second ends of the second electrically conducting vias are arranged facing some of the other tunnel barriers called the second tunnel barriers, each connecting one of the data qubits and one of the adjacent measurement qubits and located on the same column of the first matrix.

Each of the first electrically conducting portions may be connected to the first ends of the first conducting vias, the seconds ends of which are facing the first tunnel barriers connecting the data qubits and the measurement qubits located on two adjacent columns of the first matrix, and each of the second electrically conducting portions may be connected to the first ends of the second conductor vias, the second ends of which are facing the second tunnel barriers connecting the data qubits and the measurement qubits located on two adjacent rows of the first matrix.

The quantum device may also comprise a second semiconducting layer comprising a second charge detectors matrix, for example with each comprising one quantum dot, each of the measurement qubits possibly being electrically connected to one of the charge detectors through a first semiconducting portion extending between the first and second semiconducting layers, each of the first semiconducting portions possibly being coupled to at least one gate configured for controlling tunnel coupling between the charge detector and the measurement qubit connected through said first semiconducting portion. In this case, each of the first gates controls electrical conduction within one of the first semiconducting portions each of which connects one of the measurement qubits to one of the charge detectors. In this configuration, the semiconducting level in which charge detectors are made is not the same as the level in which the data qubits and the measurement qubits are located. Such a configuration solves density problems when making qubits encountered in structures according to prior art, and therefore can be used to make small data qubits and measurements qubits (for example the spacing between two adjacent qubits being between about 5 nm and 100 nm, and the lateral dimensions, for example the diameter, of each qubit being between about 5 nm and 100 nm). Constraints relate to making the second matrix of charge detectors are also reduced.

Furthermore, each of the first semiconducting portions may be coupled to a first and to a second gate configured for controlling tunnel coupling between the charge detector and the measurement qubit connected through said first semiconducting portion and that are distinct and at a distance from each other, and the quantum device may also include: third electrically conducting portions each connected to first gates located around first semiconducting portions connected at least to measurement qubits located on the same column of the first matrix; fourth electrically conducting portions each connected to second gates located around first semiconducting portions connected at least to measurement qubits located on the same row of the first matrix.

The first and second gates may be coating and each may be located around one of the first semiconducting portions.

In a second embodiment, the quantum device may also comprise a second semiconducting layer and a second charge detectors matrix formed from second semiconducting portions extending between the first and second semiconducting layers, each of the second semiconducting portions possibly being connected by at least one third tunnel barrier to at least one of the measurement qubits located in the plane of the first semiconducting layer, around said second semiconducting portion.

Unlike an embodiment in which the charge conductors are fabricated within the second semiconducting layer and in which the first semiconducting portions connect these charge detectors at least to the measurement qubits, in another embodiment, a system of fabricating charge detectors using the second semiconducting portions that extend between the first and the second semiconducting layers. In this second embodiment, the charge detectors are not addressed through the first and second gates formed around the first semiconducting portions, instead they are addressed by data qubit and measurement qubit addressing device that also act on conduction of the third tunnel barriers that connect the charge detectors to at least the measurement qubits. The benefit of this embodiment is that there is no need to make coating gates between two semiconducting layers.

According to a beneficial configuration of this other embodiment, each of the second semiconducting portions may be connected by at least two third tunnel barriers to at least two measurement qubits located in the plane of the first semiconducting layer around said second semiconducting portion. The quantum device according to this configuration has the benefit that it reduces the number of charge detectors used by putting charge detectors in common for at least several measurement qubits.

Beneficially, each data qubit may be connected to one of the charge detectors.

In this case, in the first embodiment, each data qubit may be electrically connected to one of the charge detectors through one of the first semiconducting portions that can be coupled to at least one gate configured for controlling tunnel coupling between the charge detector and the data qubit connected through said first semiconducting portion. Furthermore, as for the first semiconducting portions connecting charge detectors to the measurement qubits, each of the first semiconducting portions connecting the charge connectors to the data qubits may be coupled to a first and to a second gate configured for controlling tunnel coupling between the charge detector and the data qubit connected through the first semiconducting portion and that are distinct and at a distance from each other, and in this case with: third electrically conducting portions each connected to first gates located around first semiconducting portions connected at the data qubits located on the same column of the first matrix; fourth electrically conducting portions each connected to second gates located around first semiconducting portions connected to data qubits located on the same row of the first matrix.

For these first semiconducting portions connecting charge detectors to data qubits, it is possible that the first and second gates are coating and each is located around one of these first semiconducting portions.

In the second embodiment, when each of the data qubits is connected to one of the charge detectors, each of said second semiconducting portions may be connected by at least one third tunnel barrier to at least one of the measurement or data qubits located in the plane of the first semiconducting layer, around said second semiconducting portion. Furthermore, each of the second semiconducting portions may be connected by four third tunnel barriers to at least two measurement qubits and two data qubits located in the plane of the first semiconducting layer around the second semiconducting portion.

The first semiconducting layer may be located between the second semiconducting layer and the first and second metallization levels.

The second semiconducting layer may also comprise doped portions configured for forming charge carrier reservoirs to which the charge detectors are connected by means of fourth tunnel barriers.

According to a beneficial configuration, each of the doped portions may be connected to several charge detectors arranged on a same row or a same column of the second matrix. Putting doped portions in common at several charge detectors is advantageous because there is no need to make an individual control of the fourth tunnel barriers.

The quantum device may also comprise second gates configured for controlling conduction of each of the fourth tunnel barriers by the field effect. The second gates may be formed by fifth electrically conducting portions extending parallel to the rows or columns of the first matrix, arranged facing the fourth tunnel barriers and spaced from the fourth tunnel barriers by a second dielectric layer. Furthermore, the fifth electrically conducting portions may be formed in a conducting level such that the second semiconducting layer is located between the first semiconducting layer and the conducting level.

Each of the fifth electrically conducting portions may form several second gates.

Various embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). When applicable, some of the operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention claimed is:

1. A method for manipulating at least one group of quantum dots of a matrix of quantum dots, forming target group, each target group comprising at least one quantum dot and containing at least one charged particle, the matrix of quantum dots being configured for being connected to at least one reservoir of charged particles, each target group being defined by a potential barrier, each charged particle being a carrier of a charge and of a spin, the method comprising, for each target group:

carrying out at least one total isolation step of the target group relative to the other quantum dots of the matrix, the potential barrier separating the target group of quantum dots of the matrix adjacent to said target group being configured in such a way that the charged particle or particles contained in the target group cannot cross the potential barrier in order to be moved to the quantum dots adjacent to the target group and to the reservoir of charged particles even when such a transition is authorised from an energy standpoint, called completely isolated regime; and carrying out a manipulation step during which the target group is maintained in the completely isolated regime.

2. The method according to claim 1, wherein the manipulation step comprises at least one coherent operation.

3. The method according to claim 1, wherein the manipulation step comprises at least one electrostatic control operation.

4. The method according to claim 1, wherein the manipulation step comprises at least one spin/charge conversion operation carried out on at least one target group, said target group being divided into a first subgroup of quantum dots and a second subgroup of quantum dots, operation during which the spin state of the charged particle or particles contained in the first subgroup of quantum dots is converted, using a second subgroup of quantum dots into a charge state of the target group, the method further comprising a step of determining the charge state of the target group in such a way as to determine the spin state of the charged particle or particles contained in the first subgroup of quantum dots.

5. The method according to claim 4, wherein the step of determining the charge state is preceded by a total isolation step of each subgroup of quantum dots of the target group of quantum dots in such a way that the step of determining the charge state is done while the first subgroup and the second subgroup of the target group of quantum dot is in a completely isolated regime.

6. The method according to claim 1, wherein, during the isolation step, the manipulation step and/or, where applicable, the step of determining the charge state, the quantum dots that do not belong to a target group are in a completely isolated regime.

7. A method for determining the position of the completely isolated regime between a first quantum dot and a second quantum dot, the configuration of the system constituted by the first quantum dot and the second quantum dot able to be characterised by a first parameter $\Gamma$ relating to the potential barrier separating the two quantum dots of the system and by a second parameter $\varepsilon$ relating to the difference in energy between the ground state of the first quantum dot and the ground state of the second quantum dot, the first and the second parameters able to be modified using at least two voltages applied on gates, said system able to have the charge state, or the charge state or the charge state where the charge state corresponds to a charge state noDi for the first quantum dot and a charge state noD2 for the second quantum dot, the method comprising, for a plurality of final configurations:

for a plurality of initial configurations corresponding to a known charge state distribution, called initial charge state distribution:

a step of initialising the system in a first configuration corresponding to the initial configuration considered;

a step of decreasing the first parameter $\Gamma$, the system being in a second configuration, forming an intermediate configuration, at the end of the step of decreasing, the value of the first parameter $\Gamma$ of the intermediate configuration being equal to the value of the first parameter $\Gamma$ of the final configuration considered;

a step of varying the second parameter , a value of the first parameter being retained during the step of varying, the system being in a third configuration, corresponding to the final configuration considered at the end of the step of varying;

a step of determining the charge state of the system in the final configuration;

a step of determining the distribution of charge states measured in the final configuration;

a step of comparing the initial distribution of the charge states with the distribution of the charge states measured in the final configuration, the value of the first parameter $\Gamma$ of the final configuration corresponding to a completely isolated regime if the two distributions are substantially identical.

8. A Quantum device comprising a qubit matrix and a device configured to implement a method according to claim 1.

9. A non-transitory computer readable medium comprising instructions executable by a computer for carrying out the method according to claim 1.

* * * * *